United States Patent
Kondo

(10) Patent No.: US 9,952,679 B2
(45) Date of Patent: Apr. 24, 2018

(54) METHOD OF GIVING A MOVEMENT INSTRUCTION TO AN OBJECT IN A VIRTUAL SPACE, AND PROGRAM THEREFOR

(71) Applicant: COLOPL, Inc., Tokyo (JP)

(72) Inventor: Ippei Kondo, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/289,970

(22) Filed: Oct. 11, 2016

(65) Prior Publication Data

US 2017/0153709 A1    Jun. 1, 2017

Related U.S. Application Data

(63) Continuation of application No. PCT/JP2016/076309, filed on Sep. 7, 2016.

(30) Foreign Application Priority Data

Nov. 26, 2015    (JP) .................................. 2015-230526
Jul. 11, 2016    (JP) .................................. 2016-136802

(51) Int. Cl.
*G09G 5/00*    (2006.01)
*G06F 3/01*    (2006.01)
(Continued)

(52) U.S. Cl.
CPC ............ *G06F 3/017* (2013.01); *A63F 13/213* (2014.09); *A63F 13/24* (2014.09); *G06F 3/013* (2013.01);
(Continued)

(58) Field of Classification Search
CPC ........ A63F 9/2413; A63F 9/0013; A63F 9/98; A63F 13/00; A63F 13/213; A63F 13/24;
(Continued)

(56) References Cited

U.S. PATENT DOCUMENTS

2007/0270222 A1*  11/2007  Yamanaka ............. A63F 13/42
                                                  463/37
2009/0069096 A1*  3/2009   Nishimoto ............. A63F 13/00
                                                  463/43
(Continued)

FOREIGN PATENT DOCUMENTS

JP    2012-221498 A    11/2012
JP    2015-141686 A    8/2015

OTHER PUBLICATIONS

Office Action in JP Application No. 2015-230526, dated Apr. 12, 2016.
(Continued)

*Primary Examiner* — Kent Chang
*Assistant Examiner* — Mark Edwards
(74) *Attorney, Agent, or Firm* — Hauptman Ham, LLP

(57) ABSTRACT

To give various movement instructions by body gestures to an object in a virtual space, a method includes detecting movements of controllers held by both hands of a user. The method further includes determining a first movement instruction based on the movements of the controllers. The method further includes causing a first character gazed at by the user to perform a first movement and causing a second character not gazed at by the user to perform a second movement depending on the first movement instruction. With this, instructions are given to the characters in the virtual space by means of body gestures.

20 Claims, 9 Drawing Sheets

(51) Int. Cl.
  *G06F 3/0484* (2013.01)
  *G06F 3/0481* (2013.01)
  *G06F 3/03* (2006.01)
  *G06F 3/0346* (2013.01)
  *A63F 13/24* (2014.01)
  *A63F 13/213* (2014.01)
  *G06F 3/02* (2006.01)

(52) U.S. Cl.
  CPC .......... *G06F 3/0308* (2013.01); *G06F 3/0346* (2013.01); *G06F 3/04815* (2013.01); *G06F 3/04845* (2013.01); *G06F 3/012* (2013.01); *G06F 3/02* (2013.01)

(58) Field of Classification Search
  CPC .......... A63F 13/42; A63F 13/55; A63F 13/56; A63F 13/577; G06F 3/02; G06F 3/011; G06F 3/012; G06F 3/013; G06F 3/017; G06F 3/0308; G06F 3/0346; G06F 3/0333; G06F 3/0393; G06F 3/04815; G06F 3/04845; G06F 1/3265; G06F 1/3231; G06F 1/3218; H04W 4/008
  See application file for complete search history.

(56) References Cited

U.S. PATENT DOCUMENTS

| | | | | |
|---|---|---|---|---|
| 2010/0041483 | A1* | 2/2010 | Kobayashi | A63F 13/10 463/43 |
| 2010/0248804 | A1* | 9/2010 | Matsumaru | A63F 13/10 463/4 |
| 2012/0257035 | A1 | 10/2012 | Larsen | |
| 2014/0364209 | A1* | 12/2014 | Perry | G06F 3/013 463/31 |
| 2014/0375545 | A1* | 12/2014 | Ackerman | G06F 3/03 345/156 |

OTHER PUBLICATIONS

Decision to Grant a Patent in JP Application No. 2015-230526, dated Jun. 27, 2016.
"FIFA10 world class soccer", FAMI-TSU XBox 360, Dec. 1, 2009, vol. 8, No. 12, pp. 50-54, Enterbrain.
Shock of a room scale! "A SteamVR first item machine HTC. Vive"—Trial gameplay report, Network News by Game Watch, Jul. 24, 2015, Impress Corporation, http://game.watch.impress.co.jp/docs/news/20150724_713206.html.

* cited by examiner

METHOD OF GIVING A MOVEMENT INSTRUCTION TO AN OBJECT IN A VIRTUAL SPACE, AND PROGRAM THEREFOR

RELATED APPLICATIONS

The present application is a continuation of International Application No. PCT/JP2016/076309, filed Sep. 7, 2016, which claims priorities from Japanese Application Number 2015-230526, filed Nov. 26, 2015 and Japanese Application Number 2016-136802, filed Jul. 11, 2016. The disclosures of all of the above-listed prior-filed applications are hereby incorporated by reference herein in their entirety.

BACKGROUND

1. Field

The present disclosure relates to a method of giving a movement instruction to an object in a virtual space, and to a program therefor. More specifically, the present disclosure relates to a method of controlling, by means of gestures, an object displayed in a virtual space in which a user is immersed with use of a head-mounted display (HMD), and to a program therefor.

2. Description of the Related Art

Patent Document: Japanese Patent Application Laid-open No. 2012-221498

In a system disclosed in Japanese Patent Application Laid-open No. 2012-221498, movement instructions are given to an object displayed on a display by means of gestures. However, movement instructions cannot be given to an object in a virtual space.

SUMMARY

In order to help solve the above-mentioned problem, according to at least one embodiment, there is provided a method of giving an instruction to a character in a virtual space displayed on a head-mounted display, the method includes detecting a movement of a controller. The method further includes determining a first movement instruction based on the movement of the controller. The method further includes causing a first character gazed at by a user to perform a first movement and causing a second character not gazed at by the user to perform a second movement depending on the first movement instruction.

Further, according to at least one embodiment, there is provided a method of giving an instruction to a character in a virtual space displayed on a head-mounted display, the method includes acquiring a movement of a controller. The method further includes determining a first movement instruction based on the movement of the controller. The method further includes causing a character existing within a field-of-view region of a user to perform a first movement and causing a third character existing outside of the field-of-view region of the user to perform a third movement depending on the first movement instruction.

According to at least one embodiment, various movement instructions can be provided to the object in the virtual space by means of gestures.

DETAILED DESCRIPTION

Figure 1:
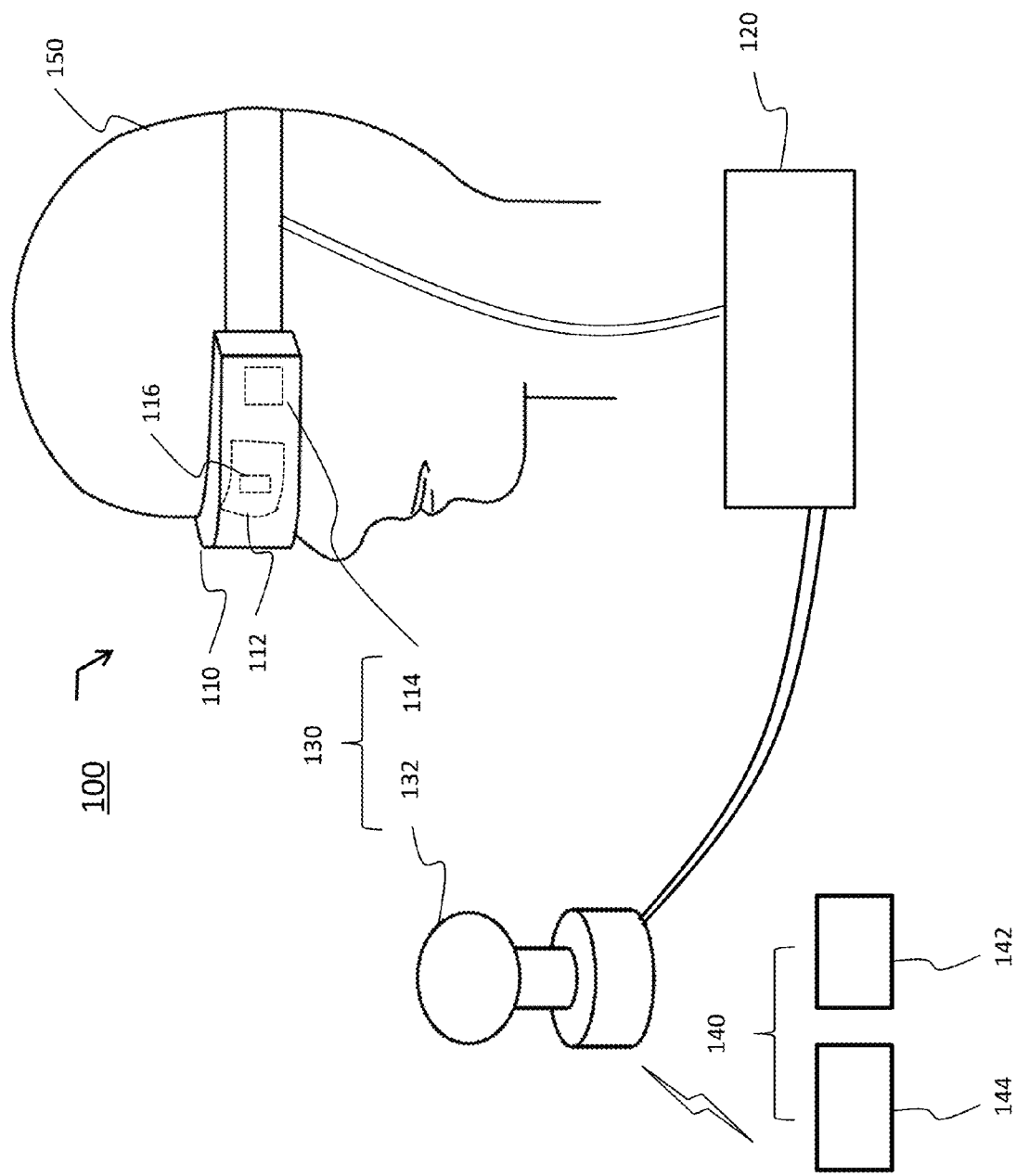
FIG. 1 is a view for illustrating an HMD system according to at least one embodiment.

First, at least one embodiment is described with reference to a list of contents thereof. A method of controlling an HMD and a program according to at least one embodiment includes the following configurations.

(Item 1)

A method of moving a character in a virtual space displayed on a head-mounted display mounted on a head of a user. The method includes detecting a movement of a controller. The method further includes determining a first movement instruction based on the movement of the controller. The method further includes causing a first character gazed at by a user to perform a first movement and causing a second character not gazed at by the user to perform a second movement depending on the first movement instruction.

(Item 2)

A method of moving a character in a virtual space displayed on a head-mounted display. The method includes acquiring a movement of a controller. The method further includes determining a first movement instruction based on the movement of the controller. The method further includes causing a character existing within a field-of-view region of the user to perform a first movement and causing a third character existing outside of the field-of-view region of a user to perform a third movement depending on the first movement instruction.

(Item 3)

A method according to Item 2, in which the character existing within the field-of-view region of the user includes a first character gazed at by the user and a second character not gazed at by the user. The method further includes causing the first character to perform the first movement and causing the second character to perform a second movement depending on the first movement instruction.

(Item 4)

A method according to Item 3, the method further including determining a second movement instruction different from the first movement instruction based on the movement of the controller. The method further includes causing a fourth character existing within the field-of-view region of the user to perform a fourth movement and causing a fifth character existing outside of the field-of-view region of the user to perform a fifth movement depending on the second movement instruction.

(Item 5)

A method according to Item 4, in which each of the first character, the second character, and the third character has a first attribute, in which each of the fourth character and the fifth character has a second attribute, and in which the first attribute differs from the second attribute.

(Item 6)

A method according to Item 3, wherein the method further includes varying the first movement, the second movement, and the third movement depending on a type of the first movement instruction.

(Item 7)

A method according to Item 4, wherein the method further includes varying the fourth movement and the fifth movement depending on a type of the second movement instruction.

(Item 8)

A method according to Item 1 or 3, in which the second movement includes the first movement performed after an elapse of a predetermined period from reception of the first movement instruction.

(Item 9)

A method according to Item 2, in which the third movement includes the first movement performed at a predetermined probability after an elapse of a predetermined period from reception of the first movement instruction.

(Item 10)

A method according to Item 4, in which the fifth movement includes the fourth movement performed after an elapse of a predetermined period from reception of the second movement instruction.

(Item 11)

A method according to Item 1 or 2, in which the movement of the controller includes movements of two controllers held by a right hand and a left hand of the user.

(Item 12)

A program for causing a computer to execute the method of any one of Items 1 to 11.

(Item 13)

A program according to Item 12, in which the program relates to a soccer game.

[Details of at Least One Embodiment]

Specific examples of a program for controlling a head-mounted display system according to at least one embodiment are described below with reference to the drawings. The present disclosure is not limited to those examples, and is defined by the scope of claims. It is intended to include all modifications within the scope of claims and the equivalents thereof. In the following description, like elements are denoted by like reference symbols in the description of the drawings, and redundant description thereof is omitted.

FIG. 1 is an illustration of an HMD system 100 including an HMD 110 according to at least one embodiment. The HMD system 100 includes the HMD 110 to be worn on the head of a user 150, a control circuit unit 120, a tracking sensor 132, and a controller 140. Now, components constructing the HMD system 100, specifically, the HMD 110, the control circuit unit 120, the tracking sensor 132, and the controller 140 are described in detail with reference to FIG. 1 to FIG. 3.

The HMD 110 includes a display 112, which is a non-transmissive display device, a sensor unit 114, and an eye gaze sensor 116. In some embodiments, the display device is a partially transmissive display device. With a right-eye image and a left-eye image displayed on the display 112, a three-dimensional image is provided as a virtual space through binocular parallax. The display 112 is arranged in front of the user's eyes, and thus the user can be immersed in the virtual space. The virtual space includes a background, various objects that can be operated by the user, menu images, and the like.

The display 112 may include a right-eye sub-display configured to provide a right-eye image, and a left-eye sub-display configured to provide a left-eye image. Further, as long as the right-eye image and the left-eye image can be provided, the display 112 may be constructed of one display device. For example, a shutter configured to enable recognition of a display image with only one eye may be switched at high speed, to thereby independently provide the right-eye image and the left-eye image.

The HMD 110 may further include the sensor unit 114 configured to detect the direction of the head of the user 150 wearing the HMD (for example, a magnetic sensor, an angular velocity sensor, or an acceleration sensor, or a combination thereof). The detected direction of the head of the user 150 may be used for changing the display image of the display 112 so as to follow the movement of the head of the user 150 when the head moves. With this, the user 150 can experience a further enhanced sense of immersion into a virtual reality space. Further, the sensor unit 114 may include a plurality of light sources. The light source is, for example, an LED configured to emit an infrared ray. The infrared ray emitted from the light source is detected as a detection point of the HMD 110 by the tracking sensor 132.

The HMD 110 may further include the eye gaze sensor 116 having an eye tracking function of detecting gaze directions of the user's right and left eyes. In at least one embodiment, the eye gaze sensor 116 includes a right-eye sensor and a left-eye sensor, which are respectively configured to detect the gaze directions of the right and left eyes, to thereby detect a line-of-sight direction in which the user focuses his/her gaze. The eye gaze sensor 116 can employ a known sensor having an eye tracking function. For example, infrared light may be radiated to each of the right eye and the left eye to acquire reflection light from the cornea or the iris, to thereby obtain a rotational angle of the eyeball.

The eye gaze sensor 116 is configured to detect the gaze directions of the user's right and left eyes, to thereby specify a point of gaze being an intersection of both directions. The point of gaze specified when the user is looking at a near place is closer to the user than the point of gaze specified when the user is looking at a far place. When the point of gaze is specified, the user's line-of-sight direction is specified. The line-of-sight direction is a direction in which the user's line of sight is actually directed with both eyes. The line-of-sight direction is defined as, for example, a direction in which a straight line, which passes through a midpoint of the user's right and left eyes and the point of gaze, extends.

[Control Circuit Unit 120]

Figure 2:
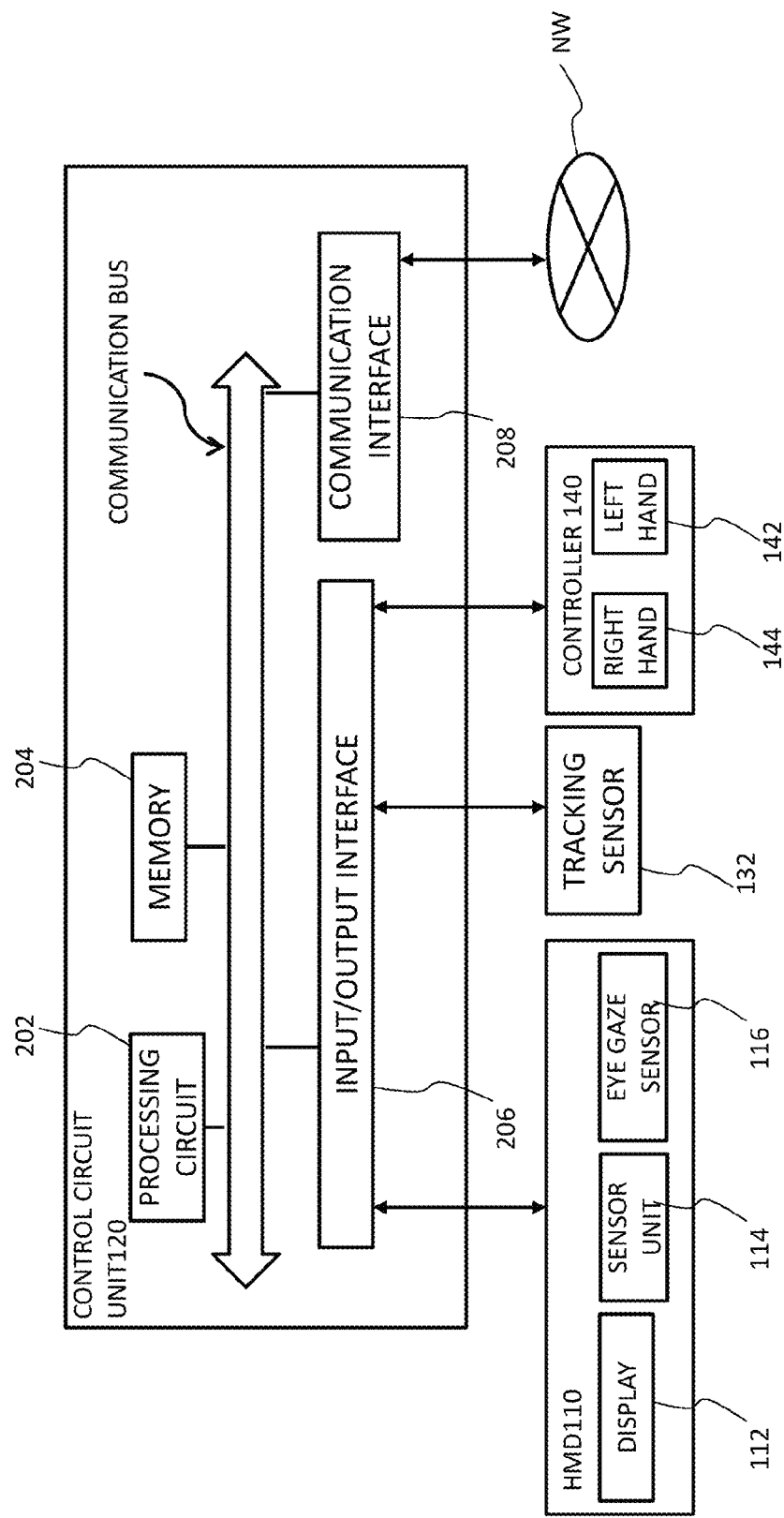
FIG. 2 is a diagram for illustrating a hardware configuration of a control circuit unit according to at least one embodiment.

The control circuit unit 120 is a computer to be connected to the HMD 110. As illustrated in FIG. 2, the control circuit unit 120 includes a processing circuit 202, a memory 204, an input/output interface 206, and a communication interface 208, which are connected to each other via a bus serving as a data transmission path.

The processing circuit 202 includes various processing circuits such as a central processing unit (CPU), a microprocessing unit (MPU), and a graphics processing unit (GPU), and has a function of controlling the entire control circuit unit 120 and HMD system 100.

The memory 204 includes a read only memory (ROM), a random access memory (RAM), and the like, and is configured to at least temporarily store control data, e.g., programs and calculation parameters to be used in the processing circuit. The memory 204 may include non-volatile storage devices such as a flash memory and a hard disc drive (HDD). In this case, the memory 204 stores data relating to various images and objects, a simulation program, and a user authentication program, and may further construct a database including a table for managing various items of data.

The input/output interface 206 includes various wire connection terminals such as a universal serial bus (USB) terminal, a digital visual interface (DVI) terminal, and a high-definition multimedia interface (HDMI) (trademark) terminal, and various processing circuits for wireless connection. The input/output interface 206 is configured to connect the HMD 110, the tracking sensor 132, and the controller 140 to each other.

The communication interface 208 includes various wire connection terminals for communicating to/from an external device via a network NW, and various processing circuits for wireless connection. The communication interface 208 is configured to adapt to various communication standards or protocols for communication via a local area network (LAN) or the Internet.

The control circuit unit 120 is configured to execute a predetermined application stored in the memory, to thereby present a virtual space on the display 112. Further, the memory stores a program for operating various objects to be displayed in the virtual space, or for displaying and controlling various menu images and the like. The control circuit unit 120 is not required to be mounted on the HMD 110, and may be constructed as separate hardware (for example, a known personal computer, or a server computer via a network). Further, only a part of the functions of the control circuit unit 120 may be mounted on the HMD 110, and the remaining functions thereof may be part of separate hardware.

[Controller 140]

Figure 3:
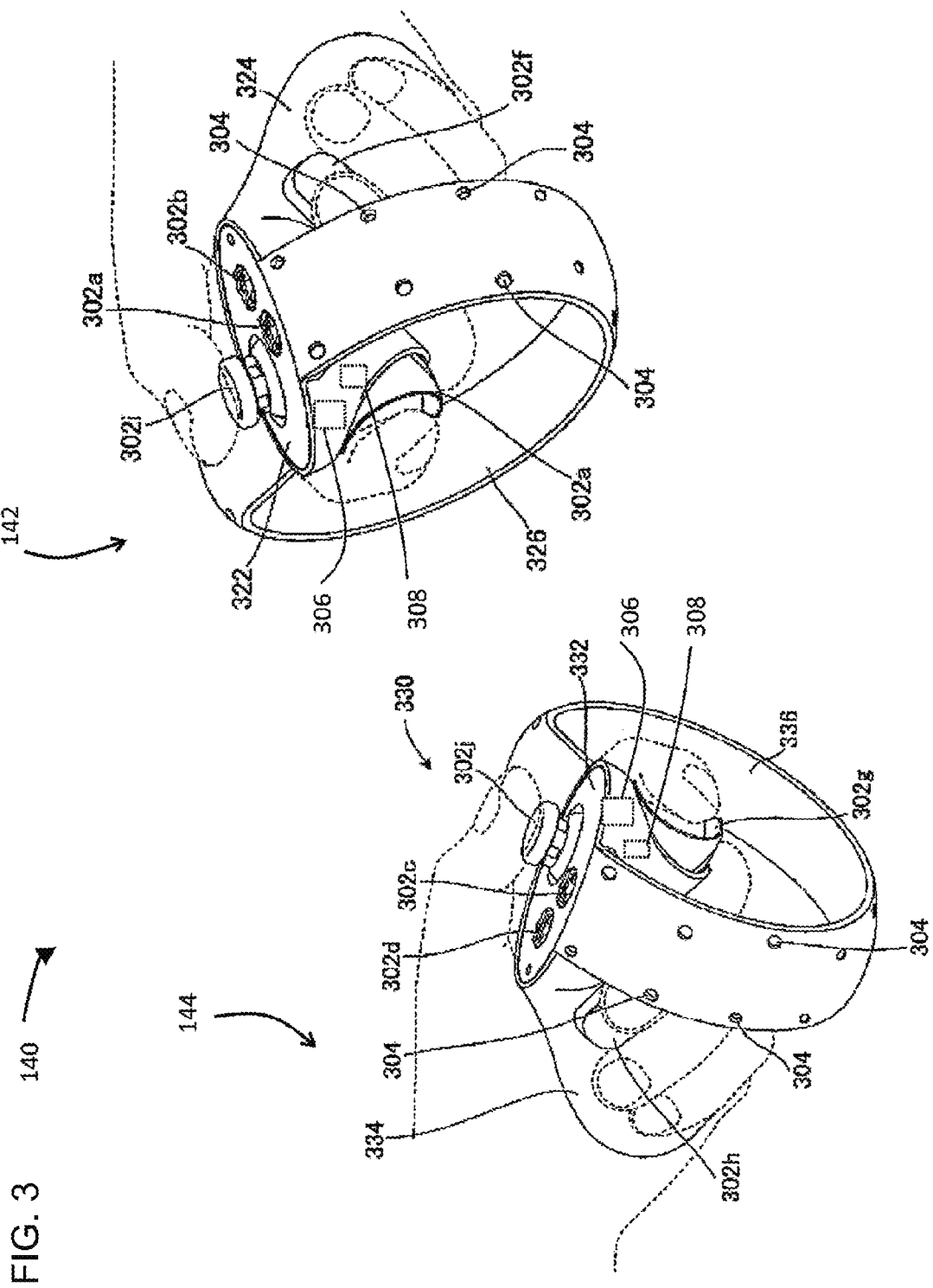
FIG. 3 is a view for illustrating an external appearance of a controller according to at least one embodiment.

The controller 140 is a device to be used by the user 150 so as to control the movement of the object in the virtual space. In at least one embodiment, the virtual space is a computer game. FIG. 3 is a view for illustrating an example of an external shape of the controller 140. An exemplary description of controller 140 is given below with reference to FIG. 3. The controller 140 includes a right-hand controller 142 to be used by the user 150 in his/her right hand, and a left-hand controller 144 to be used by the user 150 in his/her left hand. The right-hand controller 142 and the left-hand controller 144 are constructed as separate devices. Therefore, the user 150 can freely move the right hand holding the right-hand controller 142 and the left hand holding the left-hand controller 144 relative to each other. Each of the right-hand controller 142 and the left-hand controller 144 includes operation buttons 302a-302j, collectively referred to as operation buttons 302, infrared light emitting diodes (LEDs) 304, a sensor 306, and a transceiver 308. As described later, in at least one embodiment only one of the sensor 306 or the infrared LEDs 304 is provided.

The right-hand controller 142 and the left-hand controller 144 respectively include frames 326 and 336 forming semi-circular rings, which extend in a direction opposite to top surfaces (322 and 332) from both side surfaces of grips (324 and 334). On the outer surfaces of the respective frames 326 and 336, a plurality of infrared LEDs 304 is located. In at least one embodiment, infrared LEDs 304 are buried in frames 326 and 336. For example, a plurality of (for example, about 10) infrared LEDs 304 are arrayed in one row along a circumferential direction of each of the frames 326 and 336. In at least one embodiment, a plurality of rows (for example, 2 rows) of infrared LEDs 304 is arrayed along the circumferential direction of each of the frames 326 and 336. When the user 150 grips the controller 140, the fingers of the user 150 other than the thumb are positioned between the grip (324 or 334) and the frame (326 or 336). Therefore, the infrared LEDs 304 arranged on the outer surface of each of the frames 326 and 336 are not hidden by being covered with the hand or the fingers of the user 150. The infrared LEDs 304 may be further buried in a part of the surface of each of the grips 324 and 334 that is not hidden by the fingers of the user 150 in addition to the outer surface of each of the frames 326 and 336. Infrared LEDs 304 are configured to emit infrared light during manipulations of the virtual space, such as playing of a computer game. The infrared light emitted from the infrared LEDs 304 can be used for detecting the position, the posture (inclination and direction), the speed, and the acceleration of each of the right-hand controller 142 and the left-hand controller 144.

In order to enable detection of the position and the posture of each of the controllers 142 and 144, each of the right-hand controller 142 and the left-hand controller 144 further includes the sensor 306 instead of or in addition to the infrared LEDs 304. The sensor 306 may be, for example, a magnetic sensor, an angular velocity sensor, or an acceleration sensor, or a combination thereof. The sensor 306 is configured to output a value (magnetic, angular velocity, or acceleration value) corresponding to the direction and the movement of each of the controllers 142 and 144 when the user 150 moves each of the controllers 142 and 144 in his/her right and left hands. The value output from the sensor 306 is processed by an appropriate method, to thereby detect the position, the posture, the speed, and the acceleration of each of the right-hand controller 142 and the left-hand controller 144.

In this manner, according to at least one embodiment, the controller 140 detects the motion of a portion of the user 150's body. Specifically, the right-hand controller 142 detects the motion of the user's right hand, and the left-hand controller 144 detects the motion of the user's left hand. Thus, the motion of a non-head portion of the user's body is detected, allowing the movement of an object in the virtual space to be controlled based on a gesture of the user as described later. The method of detecting a non-head portion of the user's body is not limited to one using the controller 140 including a sensor mounted on the portion of the body, and image recognition besides any other physical and optical techniques are applicable. For example, a non-head portion of the user's body is detectable by using an external camera to locate a portion of the user's body and to continuously locate the portion of the user's body. Detailed description is given below of the detection of a non-head portion of the user's body by using the controller 140.

[Tracking Sensor 132]

The tracking sensor 132 is, for example, an infrared sensor, and is configured to detect the infrared ray from the light source of the sensor unit 114 as a detection point of the HMD 110, to thereby track the movement of the HMD 110. The tracking sensor 132 is further configured to detect the infrared ray emitted from the light source 304 of each of the right-hand controller 142 and the left-hand controller 144 as a detection point, to thereby track the movement of each controller. For example, the tracking sensor 132 is constructed as an infrared camera configured to take an image in an infrared wavelength region, and to transmit the data of the taken image to the control circuit unit 120. Then, the control circuit unit 120 can determine the time change in position and angle of the HMD 110 or the controller 140 based on the temporal change of the information detected by the tracking sensor 132, and can detect the information relating to the movement of the HMD 110 or the controller 140. As an example, on each of the frames 326 and 336 of the controllers, a plurality of light sources 304 is arrayed in one row. The array of bright points corresponding to the one row of light sources 304 is identified by the image taken by the infrared camera, and thus the position and the posture of each controller can be detected.

[Description of at Least One Embodiment]

The HMD system. 100 according to at least one embodiment is a system for giving various movement instructions by means of body gestures to a computer-controlled object existing in the virtual space. The body gestures are determined based on the movements of the two controllers 142 and 144 (for example, the change in position). The computer-controlled object refers to, for example, a character playing a soccer game in the virtual space.

Further, the HMD system 100 according to this embodiment is configured to determine the actual movement that the object performs based on the relationship between the position of the object in the virtual space and the position of the user 150, and/or the attribute of the object. For example, objects inside/outside a field-of-view region of the user 150 and objects gazed at or not gazed at by the user 150 may perform different movements. How to give movement instructions based on change in position or posture of the two controllers 142 and 144, and how the object is actually determined to move based on the movement instructions are described later.

Figure 4:
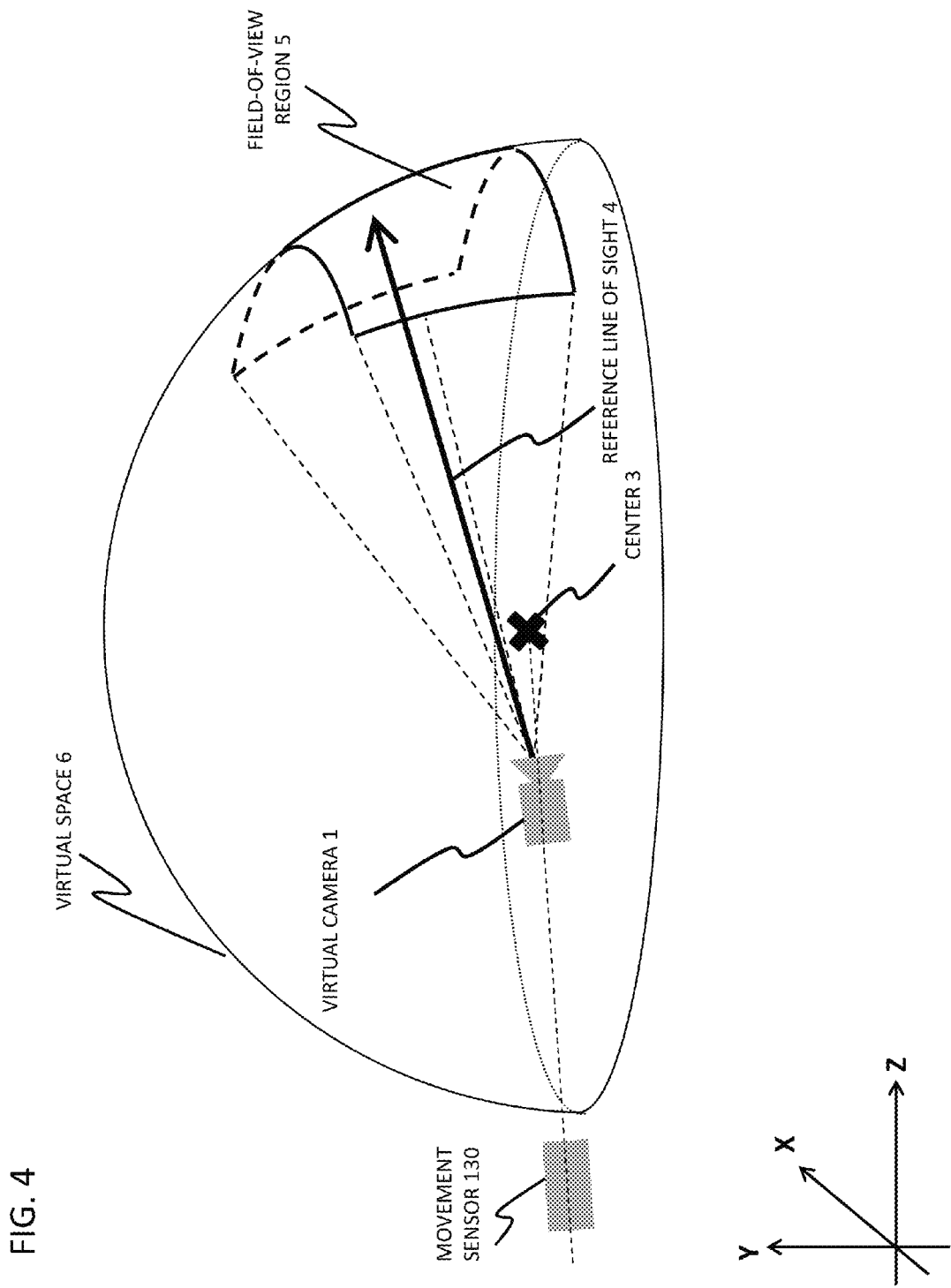
FIG. 4 is an XYZ spatial diagram for illustrating an example of a virtual space according to at least one embodiment.

FIG. 4 is an XYZ spatial diagram for illustrating an example of the virtual space according to at least one embodiment. In FIG. 4, an XZ plane represents the ground surface, and a Y axis extends in a height direction. A virtual space 6 is formed into a celestial sphere shape with a center 3. In the virtual space 6, a virtual camera 1 and one or a plurality of computer-controlled objects (not shown) are arranged. The virtual camera 1 has a first-person perspective of the user, or a perspective associated with an avatar of the user. A movement sensor 130 is configured to detect the information relating to the position and the inclination of the HMD 110. The movement sensor 130 includes the sensor unit 114 and the tracking sensor 132. A function of detecting the information relating to the position and the inclination of the HMD 110 with use of the movement sensor 130 is referred to as "position tracking".

With reference to FIG. 4, the relationship between the position tracking performed by the movement sensor 130 and the virtual camera 1 arranged in the virtual space 6 is described. In order to describe the positional relationship between the virtual camera 1 and the movement sensor 130, in the following, the position of the movement sensor 130 is set as the position of the tracking sensor 132 when the tracking sensor 132 is included, and is set as the position of the sensor unit 114 when the tracking sensor 132 is not included.

In at least one embodiment, in the XZ plane, the center 3 of the celestial sphere be adjusted to be always arranged on a line connecting between the virtual camera 1 and the movement sensor 130. For example, the virtual camera 1 may always be arranged at the center 3. Further, when the user wearing the HMD 110 moves such that the position of the virtual camera 1 moves in the X direction, the region of the virtual space 6 may be changed such that the center 3 is positioned on the extension line between the virtual camera 1 and the movement sensor 130. In those cases, the position of the virtual camera 1 in the virtual space 6 is fixed, and only the inclination thereof changes. Meanwhile, when the position of the virtual camera 1 is moved in association with the movement of the movement sensor 130 in the XYZ directions, the position of the virtual camera 1 in the virtual space 6 is set variably.

Figure 5:
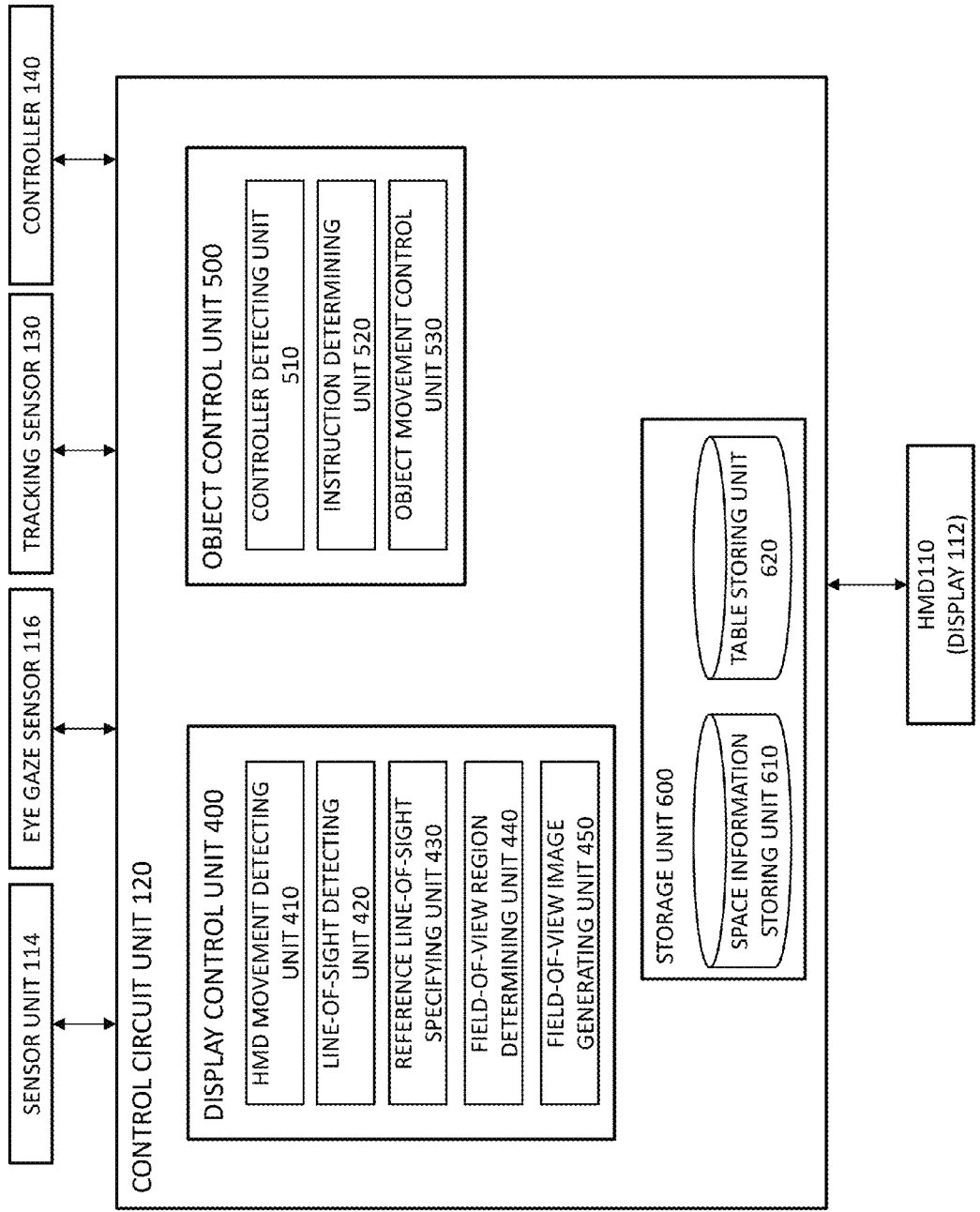
FIG. 5 is a block diagram for illustrating functions of the control circuit unit to achieve the function of the HMD system according to at least one embodiment.

FIG. 5 is a block diagram for illustrating a functional configuration of the control circuit unit 120 for performing display processing in the HMD system 100 according to at least one embodiment and for giving movement instructions and the like to characters (example of objects) by means of body gestures. The control circuit unit 120 includes a display control unit 400, an object control unit 500, and a storage unit 600. The display control unit 400 further includes an HMD movement detecting unit 410, a line-of-sight detecting unit 420, a reference line-of-sight specifying unit 430, a field-of-view region determining unit 440, and a field-of-view image generating unit 450. The object control unit 500 includes a controller detecting unit 510, an instruction determining unit 520, and an object movement control unit 530. The storage unit 600 corresponds to the memory 204 illustrated in FIG. 2. The storage unit 600 includes a space information storing unit 610 and a table storing unit 620. The display control unit 400 and the object control unit 500 are achieved by reading out and executing the computer program stored in the memory 204 by the processing circuit 202 illustrated in FIG. 2. The computer program includes a game program (for example, a soccer game program). The storage unit 600 includes the space information storing unit 610 and the table storing unit 620, and further includes various items of data required for calculation for providing, to the display 112, output information corresponding to the inputs from the sensor unit 114, the eye gaze sensor 116, the tracking sensor 132, and the controller 140.

Figure 6:
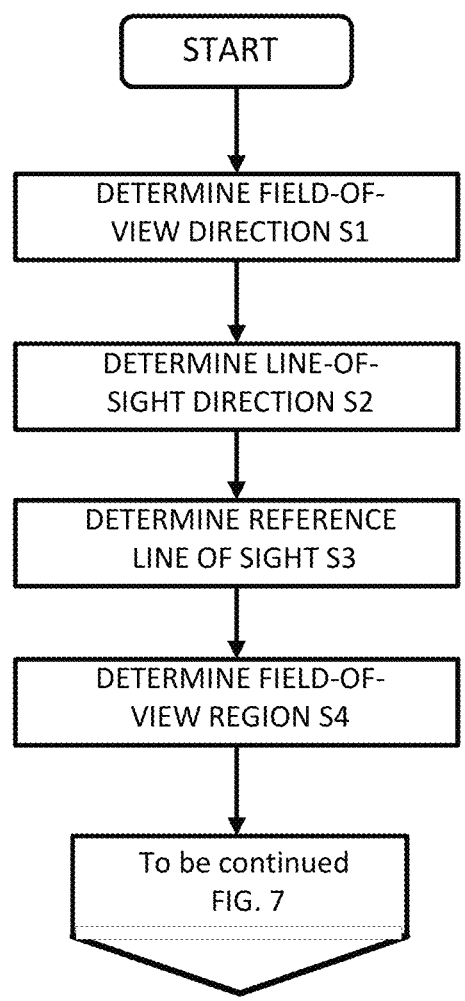
FIG. 6 is a flow chart for illustrating processing for achieving the function of the HMD system according to at least one embodiment.
Figure 7:
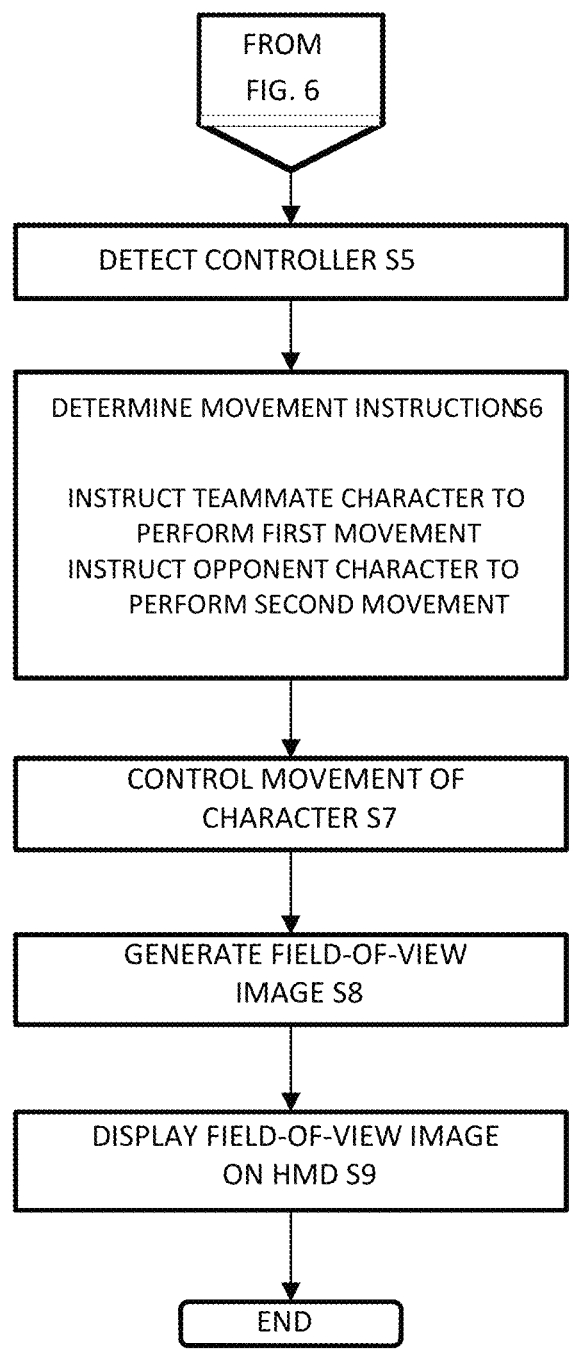
FIG. 7 is a flow chart for illustrating processing for achieving the function of the HMD system according to at least one embodiment.

First, with reference to FIG. 4 to FIG. 6, a processing flow of the respective functional units (410 to 440) for determining a field-of-view region 5 corresponding to the virtual camera 1 is described. The virtual space 6 can be provided through interactions between the HMD 110 (eye gaze sensor 116 and movement sensor 130) and the control circuit unit 120.

The HMD movement detecting unit 410 acquires the position information and the inclination information of the HMD 110 detected by the movement sensor 130, to thereby specify a field-of-view direction of the user based on the position information and the inclination information of the HMD 110 (Step S1). The position information and the inclination information of the HMD 110 can be acquired with use of both or one of the sensor unit 114 and the tracking sensor 132 fixed near the display 112. For example, the angular velocity sensor can detect over time the angular velocity about three axes of the HMD 110 based on the movement of the HMD 110, and can determine the time change of the angle about each axis. In this case, the tracking sensor 132 may be omitted. Further, the tracking sensor 132 may include an optical camera. In this case, information relating to the movement of the HMD 110 can be detected based on the image information, and thus the sensor unit 114 may be omitted.

The line-of-sight detecting unit 420 acquires information relating to the movements of the right and left eyeballs of the user detected by the eye gaze sensor 116, to thereby specify the line-of-sight direction of the user based on the information relating to the movements of the eyeballs of the user (Step S2).

The reference line-of-sight specifying unit 430 specifies a reference line of sight 4 based on the field-of-view direction specified based on the inclination of the HMD 110 and/or the line-of-sight direction of the user (Step S3). For example, a straight line connecting between the midpoint of the right and left eyes of the user 150 and the middle of the display 112 positioned in the field-of-view direction is specified as the reference line of sight 4. Further, for example, the line-of-sight direction of the user specified by the eye gaze sensor 140 is specified as the reference line of sight 4.

The field-of-view region determining unit 440 determines the field-of-view region 5 of the virtual camera 1 in the virtual space 6 based on the reference line of sight 4 (Step S4). The field-of-view region 5 of the virtual camera 1 is associated with the inclination of the HMD 110, and/or the line-of-sight direction of the user. As illustrated in FIG. 4, the field-of-view region 5 is a part of the virtual space 6, which forms the field of view of the user. The reference line of sight 4 is defined based on the position and the inclination of the virtual camera 1. The field-of-view region 5 includes a first region defined by the reference line of sight 4 and the YZ cross section of the virtual space 6, and a second region defined by the reference line of sight 4 and the XZ cross section of the virtual space 6. The first region is set as a range including a predetermined polar angle with the reference line of sight 4 being the center. The second region is set as a range including a predetermined azimuth with the reference line of sight 4 being the center.

Next, with reference to FIG. 5 and FIG. 7 to FIG. 9, a processing flow of the respective functional units (510 to 530) for giving movement instructions to the characters (example of the objects) to move the characters is described.

[Step S5]

The controller detecting unit 510 detects the position of each of the right-hand controller 142 and the left-hand controller 144, to thereby detect the movement of each controller (change in position) based on the detected position (Step S5). For example, in an initial state at the start of the computer game or the like, the right-hand controller 142 and the left-hand controller 144 are held at home positions at which the top surfaces 322 and 332 thereof are directed horizontally and the controllers are positioned near the waist of the user. After the computer program is started, the user 150 moves the right-hand controller 142 and the left-hand controller 144 to various positions to give movement instructions by means of gestures to the characters in the computer program. As an example, the computer program is a soccer game.

The controller detecting unit 510 identifies the bright points (infrared LEDs 304) in the taken image acquired by the tracking sensor 132 (infrared camera 130), to thereby detect the positions of the right-hand controller 142 and the left-hand controller 144 gripped by the user 150. As an example, the controller detecting unit 510 may determine the position of the center of gravity of the plurality of bright points forming the left group among the two groups of bright points identified from the taken image as the position of the right-hand controller 142, and may determine the position of the center of gravity of the plurality of bright points forming the right group as the position of the left-hand controller 144. In some embodiments, controller detecting unit 510 differentiates between right-hand controller 142 and left-hand controller 144 based on a relative position to HMD 110 or another suitable technique.

Alternatively, the controller detecting unit 510 may use data detected by the sensor 306 (for example, the acceleration sensor) of each of the controllers 142 and 144, to thereby detect the position of each of the controllers 142 and 144.

Alternatively, the controller detecting unit 510 may detect change in angle in three-axis directions of each of the right-hand controller 142 and the left-hand controller 144 by the sensor 306 (for example, the angular velocity sensor) of each of the controllers 142 and 144, to thereby detect the movement of each controller (change in position) based on the detected change in angle.

[Step S6]

The instruction determining unit 520 determines the movement instruction based on the movement of the controller (Step S6). The instruction determining unit 520 obtains the locus of the position of the controller based on the change in position of each of the controllers 142 and 144 detected by the controller detecting unit 510. The instruction determining unit 520 determines the movement of the controller based on the obtained locus of the position of each of the controllers 142 and 144. The instruction determining unit 520 refers to a gesture table stored in the table storing unit 620 to determine whether or not the gesture corresponding to the movement of each of the right-hand controller 142 and the left-hand controller 144 detected by the controller detecting unit 510 is present in the gesture table. When the gesture is present, the movement instruction corresponding to the gesture is determined. An example of the gesture table is shown in Table 1. The gesture table shows body gestures and movement instructions corresponding to the body gestures. Movement of the controller not shown in the gesture table is not determined as a gesture.

Figure 8:
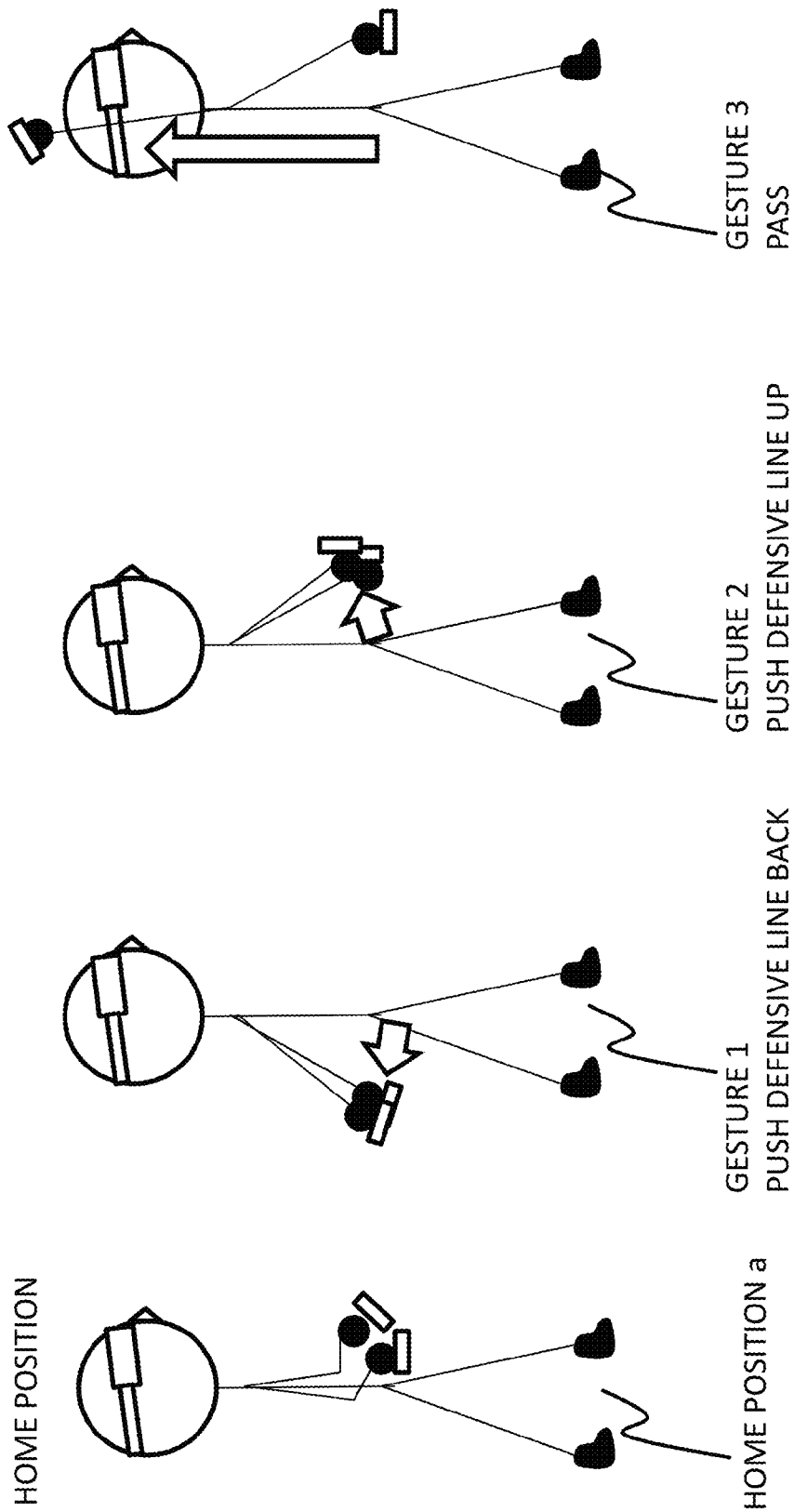
FIG. 8 is a diagram for illustrating gestures performed by a user according to at least one embodiment.

For example, the instruction determining unit 520 detects the movements of the right-hand controller 142 and the left-hand controller 144, and when it is determined that the movements correspond to a gesture (gesture 1) in which both of the right-hand controller 142 and the left-hand controller 144 are moved from the front side to the rear side, a first movement instruction corresponding to the gesture is determined. The first movement instruction refers to an instruction to be given to a teammate character by the gesture of the user 150. FIG. 8 is an illustration of a state in which the user 150 moves his/her hands holding the controllers from a home position a to perform various body gestures 1 to 3.

The instruction determining unit 520 may further vary the movement instructions based on the gesture and the attribute (for example, opponent/teammate) of the character. For example, the instruction determining unit 520 may determine a movement instruction (second movement instruction) to be given to an opponent character based on the gesture. The second movement instruction differs from the first movement instruction. For example, when the first movement instruction corresponding to a gesture 3 is an instruction to a teammate character to "pass to the user 150", the second movement instruction is an instruction to the opponent character to "mark the user 150". The first movement instruction and the second movement instruction corresponding to the gesture of the user 150 are defined in advance in the gesture table.

As shown in Table 1, a plurality of body gestures may be associated with the same movement instruction. For example, the gesture 3 and a gesture 4 are associated with one first movement instruction.

Further, in at least one embodiment, only the second movement instruction may be varied with different gestures.

For example, the gesture 3 and the gesture 4 are associated with the first movement instruction having the same content, but the contents of the second movement instruction are different.

Further, a plurality of movement instructions may be associated with one body gesture. For example, depending on whether the user is on the defense side or on the offense side, the movement instruction to be associated with the one body gesture is changed. The first movement instruction and the second movement instruction corresponding to the gesture 1 when the user is on the offense side may differ from the movement instructions when the user is on the defense side.

TABLE 1

Gesture table

| Body gesture | First movement instruction (instruction to teammate character) | Second movement instruction (instruction to opponent character) |
| --- | --- | --- |
| Gesture 1: move both controllers 142 and 144 from front side to rear side | Push defensive line back | Take off marks on characters 1 to 3 |
| Gesture 2: move both controllers 142 and 144 from rear side to front side | Push defensive line up | Mark characters 1 to 3 |
| Gesture 3: move only one controller upward and hold for certain period | Pass to user 150 | Mark user 150 (for example, always stay close to user 150) |
| Gesture 4: move only one controller to front of user | Pass to user 150 | Lightly mark user 150 (for example, always stay close to user 150, but when user 150 moves predetermined distance (for example, 10 m) or more, separate from user 150) |

Step 7

The object movement control unit 530 has the character conduct a predetermined movement according to the movement instruction (Step 7). More specifically, the object movement control unit 530 determines a movement for the character to conduct with reference to a movement table stored on the table storing unit 620 based on the movement instruction determined at Step S6. Then, the object movement control unit 530 has the character conduct the determined movement. The movement table is a table indicating a relationship between a movement instruction to be determined at Step S6 and a movement for a character to actually conduct in response to the movement instruction. The movement table is created for each gesture. The movement table is exemplified in, for example, Tables 2 and 3. Table 2 is an example of a movement table indicating the movement of a teammate character corresponding to gesture 1, and Table 3 is an example of a movement table indicating the movement of an opponent character corresponding to gesture 1. As shown in Tables 2 and 3, the movement of a character corresponding to each gesture is defined based on the position of the character in the virtual space and the attribute of the character.

[Step S7]

Figure 9:
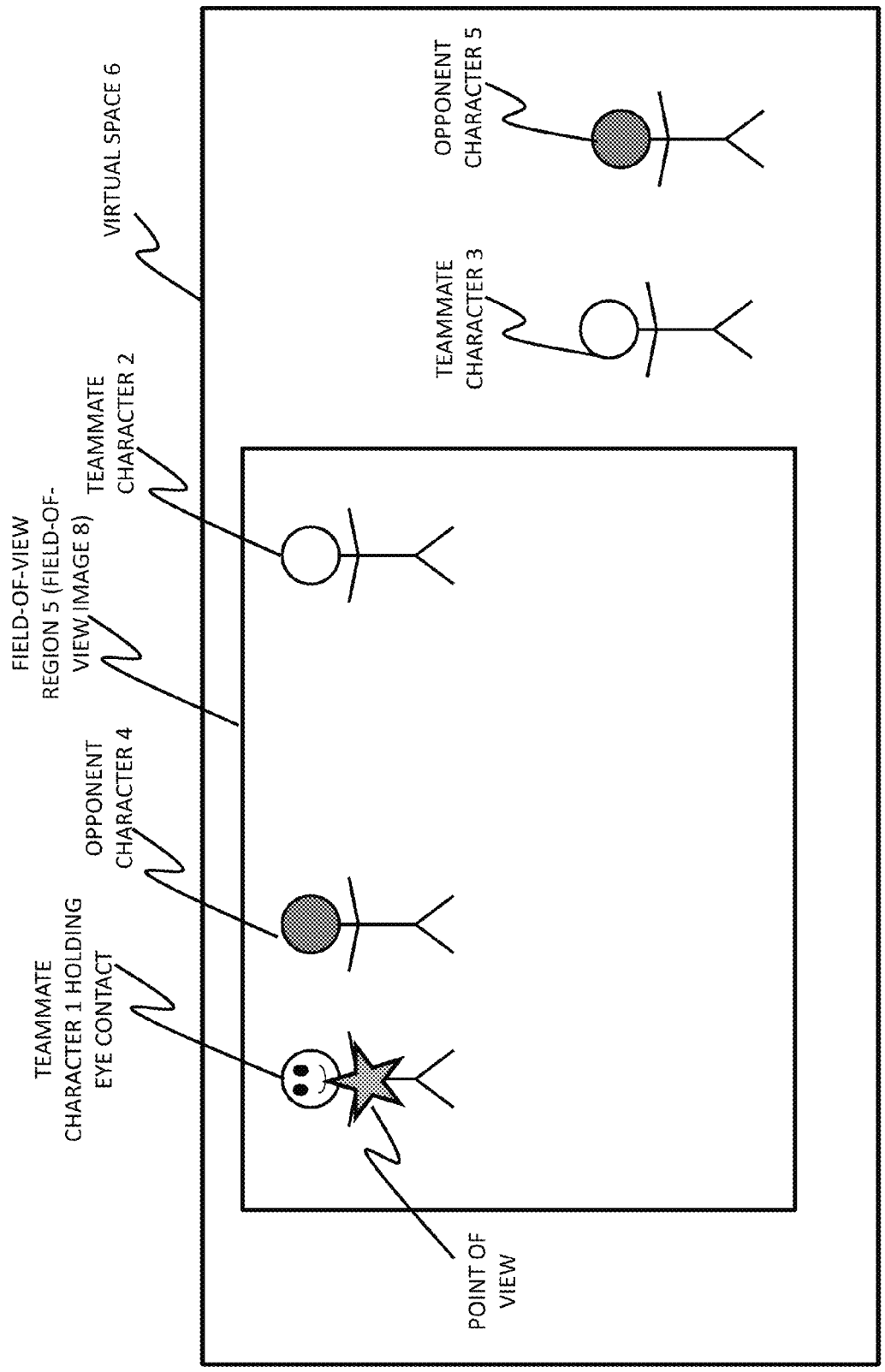
FIG. 9 is a diagram for illustrating characters positioned in a virtual space, and classifications of the characters according to at least one embodiment.

Now, with reference to FIG. 9, the characters are classified based on the positions of the characters in the virtual space and the attributes of the characters. Characters 1 to 3 are teammate characters of the user character, and characters 4 and 5 are opponent characters of the user character. The characters 1 and 2 are positioned within the field-of-view region 5. Of those, the character 1 is a character gazed at by the user 150 (focused on by the user 150). When the user 150 can visually recognize the gaze of the character 1, the character 1 may be a character holding eye contact with the user 150. The character 3 is a character positioned outside of the field-of-view region 5. The character 4 is a character positioned within the field-of-view region 5 of the user 150, and the character 5 is a character positioned outside of the field-of-view region 5.

The object movement control unit 530 determines the movement that the character performs based on the position of the character and the attribute of the character. As an example, the object movement control unit 530 causes the teammate character 1 existing within the field-of-view region 5 of the user and being gazed at by the user to perform a first movement, causes the teammate character 2 existing within the field-of-view region but not being gazed at by the user to perform a second movement, and causes the teammate character 3 existing outside of the field-of-view region of the user to perform a third movement. The first movement is a movement that starts the movement corresponding to the first movement instruction immediately after the reception of the first movement instruction (or immediately after the determination of the gesture). The second movement is, for example, the first movement performed after an elapse of a first predetermined period (for example, 2 seconds) from the reception of the first movement instruction. The third movement is, for example, the first movement performed at a first predetermined probability (for example, probability of 50%) after an elapse of a second predetermined period (for example, 3 seconds) from the reception of the first movement instruction. The teammate character 1 gazed at by the user rapidly reacts to move based on the movement instruction, while the teammate character 2 existing within the field-of-view region but not being gazed at by the user, and the teammate character 3 existing outside of the field-of-view region do not immediately react to the movement instruction. Further, teammate characters, such as teammate character 3, existing outside of the field-of-view region 5 sometimes move and sometimes do not move in response to the movement instruction. The object movement control unit 530 may cause all of the teammate characters 1 to 3 to perform the same movement depending on the first movement instruction. In some embodiments, at least one of the second movement or the third movement is different from the first movement.

Further, as another example, the object movement control unit 530 causes the opponent character 4 existing within the field-of-view region 5 of the user to perform a fourth movement, and causes the opponent character 5 existing outside of the field-of-view region 5 of the user to perform a fifth movement. The fourth movement is, for example, a movement that starts the movement corresponding to the second movement instruction immediately after the reception of the second movement instruction (or immediately after the determination of the gesture). The fifth movement is, for example, the fourth movement performed after an elapse of a third predetermined period (for example, 2 seconds) from the reception of the second movement instruction. The opponent character 4 existing within the field-of-view region 5 rapidly reacts to move based on the second movement instruction, while the opponent character 5 existing outside of the field-of-view region 5 does not immediately react to the second movement instruction. Further, the opponent characters 4 and 5 inside and outside of the field-of-view region 5 may respectively perform the fourth movement and the fifth movement at a second predetermined probability (for example, probability of 40%) depending on the movement instruction. Further, the object movement control unit 530 may cause both of the opponent characters 4 and 5 to perform the same movement depending on the second movement instruction. As described above, according to at least one embodiment, a plurality of characters can be caused to perform different movements based on one gesture. Further, according to at least one embodiment, the movement that each character performs is automatically set by a program depending on the attribute of the character and the position of the character. Therefore, a complicated game can be developed with a simple gesture operation. Further, the gesture used for giving instructions to an object can be associated with a gesture used in a real game (for example, soccer). Therefore, a user that is familiar with the real game does not need to learn special gestures for giving instructions to the object. According to at least one embodiment, instructions can be given to the characters based on intuitive gesture operations used in a real game, and hence a game can be developed with enhanced amusement.

TABLE 2

Movement table (teammate character)

| | Characters 1 and 2 within field-of-view region 5 | | Character 3 |
|---|---|---|---|
| Gesture 1 | Character 1 gazed at by user | Character 2 not gazed at by user | outside of field-of-view region 5 |
| Movement instruction to teammate character (First movement instruction: push defensive line back) | First movement (push defensive line back) | Second movement (push defensive line back after elapse of predetermined period) | Third movement (push defensive line back after elapse of predetermined period) |

TABLE 3

Movement table (opponent character)

| | Character 4 within field-of-view region 5 | Character 5 outside of field-of-view region 5 |
|---|---|---|
| Gesture 1 | | |
| Movement instruction to opponent character (Second movement instruction: take off marks on characters 1 to 3) | Fourth movement (take off mark) | Fifth movement (take off mark after elapse of predetermined period) |

[Step S8]

The field-of-view image generating unit 450 arranges, in the virtual space 6, the characters whose movements are controlled by the object movement control unit 530, and further refers to the space information storing unit 610, to thereby generate a field-of-view image 8 corresponding to the field-of-view region 5 (Step S8). With this, the field-of-view image 8 in which characters existing in the field-of-view region 5 are arranged is generated. The space information storing unit 610 stores a three-dimensional virtual space image forming the virtual space 6.

[Step S9]

The HMD 110 receives information relating to the field-of-view image 8 from the control circuit unit 120, and outputs the field-of-view image 8 to the display 112 to display the field-of-view image 8 (Step S9). The field-of-view image includes two two-dimensional images, one for the right eye and one for the left eye, and those images are superimposed on the display 112, to thereby provide the virtual space 6 to the user as a three-dimensional image.

At least one embodiment has been described above with reference to the embodiment, but the present disclosure is not limited to the above-mentioned at least one embodiment. It is to be understood by a person skilled in the art that various modifications can be made to the at least one embodiment as long as the modifications do not deviate from the spirit and scope of the present description or the scope described in the appended claims.

What is claimed is:

1. A method of moving a character in a virtual space displayed on a head-mounted display worn by a user, the method comprising:
    detecting a movement of a controller;
    determining a first movement instruction corresponding to the gestures of the user based on the movement of the controller; and
    causing a first character gazed at by the user to perform a first movement and causing a second character not gazed at by the user to perform a second movement depending on the first movement instruction, wherein
    the first movement is in response to the first movement instruction and the user gazing at the first character, and
    the second movement is in response to the first movement instruction and the user not gazing at the second character.

2. A method of moving a character in a virtual space displayed on a head-mounted display worn by a user, the method comprising:
    acquiring a movement of a controller;
    determining a first movement instruction corresponding to the gestures of the user based on the movement of the controller; and
    causing a character existing within a field-of-view region of the user to perform a first movement and causing a third character existing outside of the field-of-view region of the user to perform a third movement depending on the first movement instruction, wherein
    the first movement is in response to the first movement instruction and the user gazing at the first character, and
    the third movement is in response to the first movement instruction and the user not gazing at the third character.

3. A method according to claim 2,
    wherein the character existing within the field-of-view region of the user comprises a first character gazed at by the user and a second character not gazed at by the user, and
    wherein the method further comprises causing the first character to perform the first movement and causing the second character to perform a second movement depending on the first movement instruction.

4. A method according to claim 3, further comprising:
    determining a second movement instruction different from the first movement instruction based on the movement of the controller; and
    causing a fourth character existing within the field-of-view region of the user to perform a fourth movement and causing a fifth character existing outside of the field-of-view region of the user to perform a fifth movement depending on the second movement instruction.

5. A method according to claim 4,
wherein each of the first character, the second character, and the third character has a first attribute,
wherein each of the fourth character and the fifth character has a second attribute, and
wherein the first attribute differs from the second attribute.

6. A method according to claim 3, further comprising varying the first movement, the second movement, and the third movement depending on a type of the first movement instruction.

7. A method according to claim 4, further comprising varying the fourth movement and the fifth movement depending on a type of the second movement instruction.

8. A method according to claim 1, wherein the second movement comprises the first movement performed after an elapse of a predetermined period from reception of the first movement instruction.

9. A method according to claim 2, wherein the third movement comprises the first movement performed based on a predetermined probability after an elapse of a predetermined period from reception of the first movement instruction.

10. A method according to claim 4, wherein the fifth movement comprises the fourth movement performed after an elapse of a predetermined period from reception of the second movement instruction.

11. A method according to claim 1, wherein the movement of the controller comprises movements of two controllers held by a right hand and a left hand of the user.

12. A non-transitory computer readable medium for storing instructions for causing a computer to execute the method of claim 1.

13. A method according to claim 1, wherein the first movement instruction simultaneously causes the first character to perform the first movement and the second character to perform the second movement.

14. A method according to claim 13, wherein the first movement is different from the second movement.

15. A method according to claim 1, wherein at least one of the first character or the second character is located in a field-of-view of the user.

16. A method according to claim 15, wherein the first character and the second character are located in the field-of-view of the user.

17. A method according to claim 15, wherein the second character is caused to be located in the field-of-view of the user based on an occurrence in the virtual space.

18. A method according to claim 1, wherein the first character is a teammate character of the user and the second character is an opponent of the user.

19. A method according to claim 1, wherein the first character wherein the first character is looking toward the user in the virtual space prior to the first movement instruction.

20. A method according to claim 1, wherein the first character is a teammate character of the user and the second character is a teammate character of the user.

* * * * *